US009067423B2

(12) United States Patent
Denda et al.

(10) Patent No.: US 9,067,423 B2

(45) **Date of Patent: *Jun. 30, 2015**

(54) LIQUID CONTAINER

(71) Applicant: Seiko Epson Corporation, Tokyo (JP)

(72) Inventors: Atsushi Denda, Chino (JP); Maki Nariai, Shiojiri (JP); Naoki Koike, Matsumoto (JP); Takayoshi Kagata, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/217,916

(22) Filed: Mar. 18, 2014

(65) Prior Publication Data

US 2014/0285591 A1 Sep. 25, 2014

(30) Foreign Application Priority Data

Mar. 25, 2013 (JP) ................................ 2013-061736

(51) Int. Cl.
*B41J 2/175* (2006.01)
*G01D 11/00* (2006.01)
*C09D 11/00* (2014.01)

(52) U.S. Cl.
CPC .............. *B41J 2/17513* (2013.01); *B41J 2/175* (2013.01); *B41J 2/17523* (2013.01); *B41J 2/17526* (2013.01); *B41J 2/17533* (2013.01); *B41J 2/17546* (2013.01); *B41J 2/17553* (2013.01)

(58) Field of Classification Search
USPC ......... 347/85, 86, 95, 97, 100; 106/31.6, 400, 106/403, 404; 206/0.7, 524.3, 524.6; 427/214, 218; 428/403
See application file for complete search history.

(56) References Cited

U.S. PATENT DOCUMENTS

| | | | | |
|---|---|---|---|---|
| 6,783,584 B2 * | 8/2004 | Takahashi | ..................... | 106/403 |
| 8,088,859 B2 * | 1/2012 | Kagata et al. | ................. | 524/441 |
| 8,240,827 B2 * | 8/2012 | Sasaki | ............................. | 347/86 |
| 8,574,357 B2 * | 11/2013 | Kagata et al. | ................. | 106/404 |
| 8,770,730 B2 * | 7/2014 | Nanjo et al. | .................... | 347/86 |
| 2010/0256283 A1 | 10/2010 | Kagata et al. | | |
| 2010/0256284 A1 | 10/2010 | Kagata et al. | | |
| 2014/0285592 A1 * | 9/2014 | Koike et al. | ..................... | 347/86 |

FOREIGN PATENT DOCUMENTS

| | | |
|---|---|---|
| JP | 2006-272900 A | 10/2006 |
| JP | 2008-012762 A | 1/2008 |
| JP | 2008-207429 A | 9/2008 |
| JP | 2010-221470 A | 10/2010 |
| JP | 2012-011552 A | 1/2012 |

* cited by examiner

*Primary Examiner* — Anh T. N. Vo

(74) *Attorney, Agent, or Firm* — Harness, Dickey & Pierce, P.L.C.

(57) ABSTRACT

A liquid container according to an aspect of this invention has a containing chamber in which a liquid which temporarily generates gas by a chemical change of contained components is contained, a circulation port which communicates with the containing chamber and circulates the liquid, and a valve provided in such a manner as to connect the containing chamber to the outside thereof, in which the hydrogen penetration amount of a member partitioning the containing chamber is 0.0001 $ml/cm^2 \cdot day \cdot atm$ or more and 0.01 $ml/cm^2 \cdot day \cdot atm$ or lower per day and at least one kind of the contained components can be a base metal pigment.

8 Claims, 8 Drawing Sheets

LIQUID CONTAINER

Priority is claimed under 35 U.S.C. §119 to Japanese Application No. 2013-061736 filed on Mar. 25, 2013, which is hereby incorporated by reference in its entirety.

BACKGROUND

1. Technical Field

The present invention relates to a liquid container.

2. Related Art

In order to contain various kinds of liquid, such as ink and drink, various kinds of containers and bags (hereinafter also referred to as a "liquid container") have been used. Such a liquid container has been used for a liquid consumption apparatus, such as an ink jet printer, for example. Specifically, an ink pack, an ink cartridge, and the like which store ink to be charged into the liquid consumption apparatus are mentioned.

For example, JP-A-2008-207429 discloses an ink pack (liquid containing bag) which is removably attached to an ink jet printer and describes that the ink pack contains a film subjected to aluminum vapor deposition treatment.

On the other hand, JP-A-2006-272900, JPA-2010-221470, and JP-A-2012-11552 disclose ink cartridges to be connected to an ink jet printer and describe that an ink containing chamber which contains ink in the ink cartridge has an ink supply port for supplying the ink to a printer and an air introduction port for introducing the air into the ink containing chamber to keep the internal pressure inside the ink containing chamber at a suitable level.

The liquid contained in the above-described liquid container sometimes generates gas due to a chemical change of components contained therein. For example, when ink is used as liquid, gas is sometimes generated due to the decomposition of dyes contained in the ink or a chemical reaction of a base metal pigment, such as aluminum, and a solvent, such as water.

Therefore, when the liquid container having a sealing structure which is not provided with the air introduction port as in the ink pack described in JPA-2008-207429 is used, the container is sometimes greatly deformed or damaged due to temporarily generated gas.

On the other hand, the ink cartridges described in JP-A-2006-272900, JP-A-2010-221470, and JP-A-2012-11552 have the air introduction port for keeping the internal pressure inside the ink containing chamber at a suitable level. The air introduction port has a mechanism of taking the air thereinto when the ink in the ink containing chamber is consumed, so that the pressure inside the ink containing chamber becomes negative pressure and does not have a mechanism of discharging gas generated in the ink containing chamber. Therefore, even when the liquid container having the air introduction port as in the ink cartridges described in JP-A-2006-272900, JP-A-2010-221470, and JP-A-2012-11552 is used, the container is sometimes greatly deformed or damaged due to gas temporarily generated in the ink cartridge.

SUMMARY

An advantage of some aspects of the invention is to provide a liquid container in which, even when liquid which temporarily generates gas due to a chemical change of contained components is contained, the breakage thereof resulting from the generated gas can be prevented.

The invention has been made in order to at least partially solve the above-described problems and can be realized as the following aspects or application examples.

Application Example 1

According to an aspect of the invention, a liquid container has a containing chamber in which liquid which temporarily generates gas by a chemical change of contained components is contained, a circulation port which communicates with the containing chamber and circulates the liquid, and a valve provided in such a manner as to connect the containing chamber to the outside thereof, in which the hydrogen penetration amount of a member partitioning the containing chamber is 0.0001 ml/cm$^2$·day·atm or more and 0.01 ml/cm$^2$·day·atm or lower per day.

According to the liquid container of Application Example 1, even when liquid which temporarily generates gas by a chemical change of contained components is contained, the gas can be efficiently discharged to the outside thereof, and therefore the deformation due to the generated gas can be suppressed and the breakage can be prevented.

Application Example 2

In Application Example 1, it is preferable that at least one kind of the contained components be a base metal pigment.

Application Example 3

In Application Example 2, it is preferable that the base metal pigment be coated with a protective film.

Application Example 4

In any one of Application Example 1 to Application Example 3, it is preferable that the liquid container have a decompression chamber which is decompressed to be lower than the atmospheric pressure and at least one part of which is disposed inside the containing chamber, in which at least one part which is disposed inside the containing chamber of a member partitioning the decompression chamber have a hydrogen penetration amount of 0.0001 ml/cm$^2$·day·atm or more and 0.01 ml/cm$^2$·day·atm or lower per day.

Application Example 5

In any one of Application Example 1 to Application Example 4, it is preferable that the liquid container have a hydrogen absorption substance disposed in at least one of the containing chamber and the decompression chamber.

Application Example 6

In any one of Application Example 1 to Application Example 5, it is preferable that the liquid container have a buffer chamber which is connected to the valve and be disposed at the outside of the containing chamber, in which the buffer chamber have a hole which opens to the outside.

Application Example 7

In any one of Application Example 1 to Application Example 6, it is preferable that the liquid container be connected to a liquid consumption apparatus to be used, in which when the liquid container and the liquid consumption apparatus are connected to each other, the valve be disposed at a position where the gas gathers.

Application Example 8

In any one of Application Example 1 to Application Example 7, it is preferable that the valve be connected to at least one of the containing chamber and the decompression chamber.

Application Example 9

In any one of Application Example 1 to Application Example 8, it is preferable that the liquid container be connected to the liquid consumption apparatus to be used, in which the containing chamber have a first region and a second region where the pressure resistance be lower than the pressure resistance of the first region, and when the liquid container and the liquid consumption apparatus are connected to each other, the second region be disposed at a position where the gas gathers.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a suitable embodiment of the invention is described. The embodiment described below describes one example of the invention. Moreover, the invention is not limited to the following embodiment, and also includes various kinds of modifications carried out in the range where the gist of the invention is not altered. All the configurations described in the embodiment below are not necessarily indispensable constituent elements of the invention.

1. Liquid Container

A liquid container according to one embodiment of the invention has a containing chamber in which liquid which temporarily generates gas by a chemical change of contained components is contained, a circulation port which communicates with the containing chamber and circulates the liquid, and a valve provided in such a manner as to connect the containing chamber to the outside thereof, in which the hydrogen penetration amount of a member partitioning the containing chamber is 0.0001 ml/cm$^2$·day·atm or more and 0.01 ml/cm$^2$·day·atm or lower per day.

Hereinafter, the liquid container according to this embodiment is described in detail in order of the structure of the liquid container and the liquid contained therein.

1.1. Structure of Liquid Container

Figure 1:
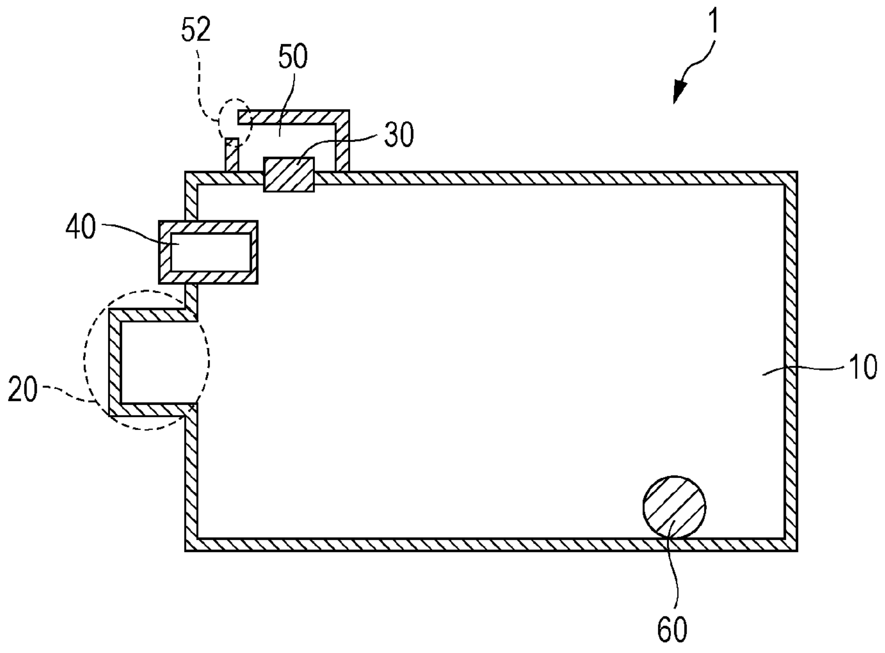
FIG. 1 is a schematic view of the cross section of a liquid container according to one embodiment of the invention.

The structure of a liquid container 1 according to this embodiment is described in detail with reference to FIG. 1. The structure of the liquid container 1 described below is one embodiment of the invention and the liquid container according to an aspect of the invention is not limited thereto. In FIG. 1, in order to facilitate the understanding of the structure of the liquid container 1, the scale therein is altered as appropriate in some cases.

FIG. 1 is a schematic view of the cross section of the liquid container 1. In the example of FIG. 1, the liquid container 1 has a containing chamber 10 in which liquid described later is contained, a circulation port 20 which communicates with the containing chamber 10 and circulates the liquid, and a valve 30 provided in such a manner as to connect the containing chamber 10 to the outside thereof.

1.1.1. Containing Chamber

As the shape of the containing chamber 10, the case where the cross sectional shape thereof is a rectangular shape is illustrated in the example of FIG. 1 but the shape is not limited to the shape insofar as the containing chamber has a structure in which liquid can be contained. For example, the containing chamber 10 may have any three dimensional shape, such as a square column, a cylindrical column, an oval column, a sphere, an oval, and a combination thereof.

The containing chamber 10 may be one at least one surface of which is formed with a flexible member, such as film, or one all the surfaces of which are formed with a member not having flexibility (for example, plastic plate). Among the above, when using the liquid container 1 as an ink pack for an ink jet type printing apparatus described later, it is preferable that at least one surface of the containing chamber 10 has flexibility from the viewpoint of facilitating the outflow of ink.

A member partitioning the containing chamber 10 may be one containing a single material or may be one containing two or more materials in combination. As a specific example, when the member partitioning the containing chamber 10 is a film, the case where the member partitioning the containing chamber 10 contains a single layer film, the case where the member contains a film of two or more layers, and the like are mentioned. When the member contains a film of two or more layers, one obtained by bonding each layer with an adhesive or the like, one obtained by bonding each layer with heat or the like, or one obtained by vapor depositing another layer to a first layer may be acceptable.

For the member partitioning the containing chamber 10, a member having a hydrogen penetration amount under a 25° C. environment of 0.0001 ml/cm$^2$·day·atm or more and 0.01 ml/cm$^2$·day·atm or lower per day is required to use and it is preferable to use a member having a hydrogen penetration amount under a 25° C. environment of 0.001 ml/cm$^2$·day·atm or more and 0.008 ml/cm$^2$·day·atm or lower per day. When the hydrogen penetration amount of the member partitioning the containing chamber 10 is in the range mentioned above, the gas (particularly hydrogen) generated in the containing chamber 10 can be discharged to the outside and the breakage and the like of the containing chamber 10 can be suppressed. In particular, even in the case where an ink containing a base metal pigment and water (described later) is contained in the containing chamber 10, the effect is sufficiently obtained.

On the other hand, when a member having a hydrogen penetration amount under a 25° C. environment of lower than 0.0001 ml/cm$^2$·day·atm per day is used (for example, aluminum and the like), it becomes difficult to discharge the gas generated in the containing chamber 10 to the outside, which sometimes causes the breakage and the deformation of the containing chamber 10. When a member having a hydrogen penetration amount under a 25° C. environment of higher than 0.01 ml/cm$^2$·day·atm per day is used (for example, polyethylene with a film thickness of 200 μm, and the like), the permeation amount of oxygen, nitrogen, and moisture contained in the atmosphere into the containing chamber 10 increases, so that problems, such as fluctuation of the physical properties of ink, tend to arise.

As materials constituting the member satisfying the hydrogen penetration amount mentioned above, aluminum oxide, an ethylene-vinyl acetate copolymer, and the like are mentioned, for example. The member may be one obtained using the materials alone, may be one obtained by mixing the same with materials improving the physical strength of the containing chamber and giving sealing properties by thermocompression bonding, such as nylon, polyethylene, polypropylene, and polyester, or may be one having a plurality of layers containing the materials alone or obtained by mixing two or more kinds thereof.

The hydrogen penetration amount of the member partitioning the containing chamber 10 can be measured based on the Archimedes method and specifically can be calculated as follows. First, a sealable pack containing the member partitioning the containing chamber 10 is prepared, the inside thereof is filled with hydrogen gas, and then the pack is sealed. Immediately after the sealing, the pack is completely submerged in water of a measuring cylinder. Then, the volume [H1 (ml)] of water which increased at this time is recorded. Then, the pack is taken out of the measuring cylinder, the ink pack is stored under a 25° C. environment for 24 hours, and then the pack is completely submerged in water of a measuring cylinder again. Then, the volume [H2 (ml)] of the water at this time is recorded. Then, the difference between H1 and H2 (H1−H2) is divided by the surface area (cm$^2$) of the surface of the inside of the pack, whereby the hydrogen penetration amount per day under a 25° C. environment [H3 (ml/cm$^2$·day·atm)] is derived.

The vapor (water) penetration amount of the member partitioning the containing chamber 10 is preferably lower than the hydrogen penetration amount under a 25° C. environment (comparison per day under a 25° C. environment). Specifically, as the member partitioning the containing chamber 10, one having a vapor (water) penetration amount under a 25° C. environment of 0.0001 g/cm$^2$·day·atm or more and 0.01 g/cm$^2$·day·atm or lower per day is preferably used and one having the penetration amount of 0.001 g/cm$^2$·day·atm or more and 0.008 g/cm$^2$·day·atm or lower per day is more preferable. Thus, when the liquid contained in the containing chamber 10 contains moisture, the emission of the moisture to the outside of the containing chamber 10 can be suppressed and the storage stability of the liquid can be improved.

The penetration amount of water (vapor) of the member partitioning the containing chamber 10 can be measured as follows. First, a sealable pack containing the member partitioning the containing chamber 10 is prepared, the inside thereof is filled with water, the pack is sealed, and then the mass [W1 (g)] of the pack immediately after the sealing is recorded. Then, the pack is stored under a 25° C. environment for 24 hours, and then the mass [W2 (g)] of the pack is recorded again. The difference between W1 and W2 [W1−W2 (g)] thus obtained is divided by the surface area (cm$^2$) of the surface of the inside of the pack, whereby the penetration amount [W3 (g/cm$^2$·day·atm)] of vapor per day under a 25° C. environment (water) is derived.

Mentioned as the material constituting the member satisfying the penetration amount of water (vapor) above while satisfying the hydrogen penetration amount mentioned above are a member (particularly film) having a structure of three or more layers of polyester, an ethylene-vinyl acetate copolymer, and polyethylene, a member (particularly film) having a structure of three or more layers of polyester, alumina, and polyethylene, and the like.

Moreover, as disclosed in JP-A-2008-12762, a film to which aluminum is vapor deposited is remarkably excellent in gas barrier properties (difficulty of penetration of gas) and vapor barrier properties (difficulty of penetration of vapor) as compared with a polyethylene film and the like to which aluminum is not vapor deposited. Therefore, it is preferable that a film constituting an ink containing portion does not substantially contain an aluminum layer. The description "not substantially containing" refers to, as an example, the fact that the thickness is preferably 5 μm or lower and more preferably 1 μm or lower and it is particularly preferable that a layer containing aluminum is not contained at all. Thus, due to the fact that a layer containing aluminum with a thickness of larger than 5 μm is not contained, the hydrogen gas generated in the ink containing portion is easily discharged to the outside of the ink containing portion, so that the expansion of the ink containing portion can be suppressed or the breakage thereof can be prevented. The description of 5 μm or lower and the description of 1 μm or lower also include 0 μm.

The thickness of the member partitioning the containing chamber 10 is not particularly limited. When using the liquid container 1 as an ink pack for ink jet printer described later, the thickness is preferably 50 μm or more and 300 μm or lower and more preferably 50 μm or more and 200 μm or lower. Due to the fact that the thickness of the film is 50 μm or more, the containing chamber 10 contracts in a normal shape when the ink in the containing chamber 10 is sucked to flow out of the containing chamber 10, and therefore, the ink in the containing chamber 10 can be favorably caused to flow out. Moreover, due to the fact that the thickness of the film is 300 μm or lower, the rigidity of the containing chamber is set in a proper range. Therefore, when the liquid container is shaken, the ink in the containing chamber 10 is favorably stirred.

The pressure resistance of the member partitioning the containing chamber 10 may be higher than the operation pressure of the valve 30 described later and, for example, can be set to 1.5 atm or more and preferably 2.0 atm or more, and further can be set to 2.0 atm or more and lower than 3.0 atm.

The member partitioning the containing chamber 10 preferably has a first region and a second region where the pressure resistance is lower than that of the first region. Thus, a region (i.e., the second region) which is easily damaged can be preferentially determined beforehand. Therefore, even when the breakage of the member partitioning the containing chamber 10 occurs, the damaged portion can be easily specified. The second region is preferably provided at a position where the gas gathers when the liquid container 1 and a liquid consumption apparatus (described later) are connected to each other.

Both a first packaging body 72 (described later) and the member partitioning the containing chamber 10 may have a first region and a second region where the pressure resistance is lower than that of the first region. In this case, when the breakage of the member partitioning the containing chamber 10 and the first packaging body 72 provisionally occur due to the gas discharged from the containing chamber 10, the second region of the member partitioning the containing chamber 10 is damaged, and then the second region of the first packaging body 72 is damaged. In such a case, the second region of the first packaging body 72 is preferably provided in such a manner as to open in a direction other than the downward direction. Such an aspect is preferable in the respect that the leaking liquid becomes further difficult to leak out to the outside of the first packaging body 72. Furthermore, as a more preferable aspect, the second region of the first packaging body 72 is provided in such a manner as to open in the upward direction.

As another preferable aspect, the second region of the first packaging body 72 and the second region of the member partitioning the containing chamber 10 are provided in such a manner as to open in different directions. For example, when the second region of the member partitioning the containing chamber 10 is provided in such a manner as to open in the downward direction, it is preferable that the second region of the first packaging body 72 is provided in such a manner as to open in the transverse direction or in the upward direction. As the most suitable combination in the case where the second regions open in different directions, the case is mentioned where the second region of the member partitioning the containing chamber 10 opens in the downward direction and the second region of the first packaging body 72 opens in the upward direction, which is preferable in the viewpoint that the leakage of liquid can be further suppressed.

As the position relationship of the second region of the member partitioning the containing chamber 10 and the second region of the first packaging body 72, when the second regions are connected by the straight line passing through the containing chamber 10, it is more preferable that the second regions are disposed in such a manner that the distance (line segment) of the straight line reaches the maximum. Thus, the liquid becomes further difficult to leak out to the outside of the packaging body 70.

Moreover, in order to notably demonstrate the effect, it is preferable to specify a storage manner of the liquid container 1 to persons, such as users. For example, by indicating "Store with this side up", "Not store with this side down", and the like on the member partitioning the containing chamber 10, the first packaging body (described later), or the second packaging body (described later) to specify the storage manner to users, the effect is easily notably demonstrated. The indication manner is not limited to the direct indication and indication in other media, such as a manual, may be acceptable.

Herein, as a suitable example of the position where the gas generated in the containing chamber 10 gathers when the liquid container 1 is connected to a liquid consumption apparatus, a region including the highest position in the vertical direction in the containing chamber 10 is mentioned. In this case, it can be said in other words that the second region is disposed in a region including the highest position in the vertical direction in the containing chamber 10 when the liquid container 1 and the liquid consumption apparatus are connected to each other. Thus, due to the fact that the second region is present in the region including the highest position in the vertical direction in the containing chambers 10, even when the second region is provisionally damaged, the liquid becomes difficult to leak out to the outside of the containing chamber 10. When the height of the upper surface of the containing chamber 10 is entirely uniform, the upper surface corresponds to "the highest position" when the second region is provided on the upper surface.

A method of setting the pressure resistance of the second region to be lower than that of the first region is not particularly limited and includes reducing the thickness of the second region than that of the first region, using a member which has a pressure resistance lower than that of the first region as a member constituting the second region, reducing the adhesion conditions (for example, temperature) of a film member, cutting the second region, and the like, for example.

During the transportation and the storage of the liquid container 1, it is preferable that the second region of the containing chamber 10 is disposed in a region including the highest position in the vertical direction similarly as in the case of connecting the liquid container 1 to a liquid consumption apparatus. Thus, even when the second region is provisionally damaged during the transportation and the storage of the liquid container 1, the liquid becomes difficult to leak out to the outside of the containing chamber 10.

The capacity of the containing chamber 10 is not particularly limited. When using the liquid container 1 as an ink pack for ink jet printer described later, the capacity can be set to 30 $cm^3$ or more and 1000 $cm^3$ or lower and further can be set to 80 $cm^3$ or more and 750 $cm^3$ or lower, for example. The capacity of the containing chamber 10 refers to the internal capacity of the containing chamber 10.

The surface area of the containing chamber 10 is not particularly limited. When using the liquid container 1 as an ink pack for ink jet printer described later, the surface area can be set to 40 $cm^2$ or more and 1600 $cm^2$ or lower and further can be set to 120 $cm^2$ or more and 1200 $cm^2$ or lower, for example. The surface area of the containing chamber 10 refers to an area of the surface capable of contacting liquid in the containing chamber 10.

1.1.2. Circulation Port

A circulation port 20 communicates with the containing chamber 10 to circulate liquid. More specifically, when liquid is stored in the containing chamber 10 or when liquid is caused to flow out of the containing chamber 10, the storage and the flowing-out of the liquid can be carried out through the circulation port 20. In the example of FIG. 1, the case where the liquid container 1 has one circulation port 20 is illustrated but two or more circulation ports 20 may be provided. When having two or more circulation ports 20, the ports can be separately used as, for example, an inflow port for causing liquid to flow into the containing chamber 10 and an outflow port for causing the liquid in the containing chamber 10 to flow out to the outside.

The circulation port 20 is provided at the central portion of a surface (or a side) having a lateral direction of the containing chamber 10 in the example of FIG. 1. However, the position is not limited thereto and the circulation port 20 may be provided at any position of the containing chamber 10. As the shape of the circulation port 20, the case where the cross sectional shape is a rectangular shape is illustrated in the example of FIG. 1. However, the shape is not limited thereto and, for example, the three dimensional shape thereof may be any shape, such as a square column, a cylindrical column, an oval column, a sphere, an oval, and a combination thereof.

The circulation port 20 may be integrally formed with the containing chamber 10 when forming the containing chamber 10 or may be formed by joining a member constituting the circulation port 20 to the containing chamber 10. In order to prevent liquid in the containing chamber 10 from leaking out to the outside, the circulation port 20 can be sealed with, for example, a rubber plug, a resin cap, and the like or the circulation port 20 can be sealed by welding and the like after storing liquid in the containing chamber 10, excluding during the circulation of the liquid.

As the member constituting the circulation port 20, a material which does not allow the liquid contained in the containing chamber 10 to leak out may be selected as appropriate. Materials capable of discharging the gas generated in the containing chamber 10 to the outside are preferably used and specifically the same materials as those of the member partitioning the containing chamber 10 are more preferably used.

1.1.3. Valve

The valve 30 is provided in such a manner as to connect the containing chamber 10 to the outside thereof. The valve 30 has a function of discharging the gas in the containing chamber 10 to the outside when the pressure in the containing chamber 10 increases due to the gas generated in the containing chamber 10. Thus, since the liquid container 1 according to this embodiment has the valve 30 of discharging the gas in the containing chamber 10 to the outside and the containing chamber 10 containing a member having the above-described specific hydrogen penetration amount, the effect of preventing the breakage of the containing chamber 10 is notably demonstrated.

For the valve 30, valves of all known mechanisms can be used insofar as the valves have a mechanism capable of discharging the gas generated in the containing chamber 10 to the outside. For example, in the case where a valve having a mechanism in which the valve opens when a specific pressure is applied (also referred to as an "opening-and-closing valve") is used as the valve 30, when the pressure in the containing chamber 10 exceeds a specific value due to the generated gas, the valve 30 opens to discharge the gas in the containing chamber 10 to the outside. Thus, the pressure in the containing chamber 10 decreases, so that the deformation and the breakage of the containing chamber 10 can be suppressed. As the mechanism for opening and closing the valve 30, elastic members, such as a spring and rubber, are mentioned. When pressure arises exceeding the biasing force of the spring and the rubber, the valve is opened.

The operation pressure for opening the valve 30 may be lower than the pressure resistance of the member partitioning the containing chamber 10 and, for example, can be set to 1.2 atm or more and lower than 2.0 atm and preferably 1.3 atm or more and lower than 2.0 atm. By setting the operation pressure in this range, the balance of the stability of the liquid container 1 and the prevention of malfunction of the valve can be maintained.

The valve 30 is disposed in such a manner as to be connected to the containing chamber 10 in the example of FIG. 1 but the disposing manner is not limited thereto. The valve 30 may be disposed in such a manner as to be connected to a decompression chamber 40 (described later). FIG. 1 illustrates the case where one valve 30 is provided but two or more valves 30 may be provided. When two or more valves are provided, the valves 30 can be disposed in such a manner as to be connected to the containing chamber 10 and the decompression chamber 40, respectively. Due to the fact that two or more valves 30 are provided, the effect of discharging the gas generated in the containing chamber 10 to the outside further improves.

When the liquid container 1 according to this embodiment is connected to a liquid consumption apparatus (described later), the valve 30 is preferably provided at the position where the gas generated in the containing chamber 10 gathers when the liquid container 1 and a liquid consumption apparatus are connected to each other. Thus, since the gas generated in the containing chamber 10 can be efficiently discharged to the outside before the operation of the liquid consumption apparatus, the mixing of the gas generated in the containing chamber 10 into the liquid consumption apparatus can be suppressed. Herein, the position where the gas generated in the containing chamber 10 when the liquid container 1 is connected to the liquid consumption apparatus gathers, a region including the highest position in the vertical direction in the containing chamber 10 is mentioned. In this case, it can be said in other words that the valve 30 is disposed in such a manner as to include a region including the highest position in the vertical direction in the containing chamber 10 when the liquid container 1 and the liquid consumption apparatus are connected to each other. When the height of the upper surface of the containing chamber 10 is entirely uniform, the upper surface corresponds to "the highest position" when the vale 30 is provided on the upper surface.

1.1.4. Decompression Chamber

The liquid container 1 according to this embodiment may have the decompression chamber 40. In the decompression chamber 40, the pressure is reduced to be lower than the atmospheric pressure. At least one part of the decompression chamber 40 can be disposed in the containing chamber 10 as illustrated in FIG. 1. Since the decompression chamber 40 is connected to the containing chamber 10 in a state where the pressure is reduced to be lower than the atmospheric pressure, the gas generated in the containing chamber 10 easily flows into the decompression chamber 40. Thus, the internal pressure of the containing chambers 10 can be reduced, so that the deformation and the breakage of the containing chamber 10 can be suppressed.

With respect to the decompression chamber 40, at least one part thereof may be disposed in the containing chamber 10 in such a manner that the gas generated in the containing chamber 10 can be collected. For example, the decompression chamber 40 may be entirely fixed and disposed in the containing chamber 10 or the decompression chamber 40 may be placed in such a manner as to float on the liquid surface of the liquid or in the liquid in the containing chamber 10.

The capacity of the decompression chamber 40 is not particularly limited but can be set to 5% or more and 30% or lower based on the capacity of the containing chamber 10 from the respects that the gas discharged from the valve 30 can be sufficiently held and the size of the liquid container 1 can be reduced. The capacity of the decompression chamber 40 refers to the capacity inside the decompression chamber 40.

As the shape of the decompression chamber 40, the case where the cross sectional shape is a rectangular shape is illustrated in the example of FIG. 1 but the shape is not limited thereto. For example, the decompression chamber 40 may have any three dimensional shape, such as a square column, a cylindrical column, an oval column, a sphere, an oval, and a combination thereof.

As the member partitioning the decompression chamber 40 provided in the containing chamber 10, it is preferable to use a material capable of preventing the liquid in the containing chamber 10 from flowing into the decompression chamber 40. As such a material, the material mentioned as the member partitioning the containing chamber 10 can be used, for example.

For at least one part disposed in the containing chamber 10 of the member partitioning the decompression chamber 40, those having a hydrogen penetration amount of 0.0001 $ml/cm^2 \cdot day \cdot atm$ or more and 0.01 $ml/cm^2 \cdot day \cdot atm$ or lower per day are preferably used and those having a hydrogen penetration amount of 0.001 $ml/cm^2 \cdot day \cdot atm$ or more and 0.008 $ml/cm^2 \cdot day \cdot atm$ or lower are preferably used in order to cause the gas (particularly hydrogen) generated in the containing chamber 10 to flow into the decompression chamber 40. When the hydrogen penetration amount of the member partitioning the containing chamber 10 is in the range mentioned above, the gas (particularly hydrogen) generated in the containing chamber 10 can be caused to favorably flow into the decompression chamber 40. The measurement of the hydrogen penetration amount can be performed by the same method as the method mentioned in the description of the member constituting the containing chamber 10 above.

As materials constituting the member satisfying the hydrogen penetration amount mentioned above, the materials mentioned as the member partitioning the containing chamber 10 can be used. Among the materials, a member (particularly film) containing at least two layers of an ethylene-vinyl acetate copolymer and polyethylene is preferably used.

Among the members constituting the decompression chamber 40, the thickness of the member having the hydrogen penetration amount mentioned above is not particularly limited and can be set to 50 μm or more and 300 μm or lower, for example.

As described above, the decompression chamber 40 may be connected to the valve 30. Due to the fact that the decompression chamber 40 is connected to the valve 30, the gas flowing into the decompression chamber 40 can be discharged to the outside (i.e., outside of the decompression chamber 40 and the containing chamber 10). When the decompression chamber 40 and the valve 30 are connected to each other, at least one part of the decompression chamber 40 is required to be exposed to the outside of the containing chamber 10 in such a manner that the gas discharged from the valve 30 through the decompression chamber 40 does not flow into the containing chamber 10 again. The valve 30 may be disposed at the exposed portion.

1.1.5. Buffer Chamber

The liquid container 1 according to this embodiment may have a buffer chamber 50. The buffer chamber 50 can be connected to the valve 30 and can be provided at the outside of the containing chamber 10. In the example of FIG. 1, the buffer chamber 50 is disposed in such a manner as to surround a portion present on the outside of the containing chamber 10 of the valve 30 and is fixed by being connected to the outer wall of the containing chamber 10.

The liquid contained in the containing chamber 10 sometimes leaks out to the outside of the containing chamber 10 when the gas generated in the containing chamber 10 is discharged to the outside through the valve 30. Even in such a case, the liquid leaking out of the containing chamber 10 can be held in the buffer chamber 50. Therefore, the liquid can be suppressed from leaking out to the outside of the liquid container 1. When the buffer chamber 50 has a hole 52, it is preferable to design the size of the hole 52 in such a manner that, when a large amount of gas flows into the buffer chamber 50 through the valve 30, the gas can be slowly discharged to the outside over a long time.

As the shape of the buffer chamber 50, the case where the cross sectional shape thereof is a rectangular shape is illustrated in the example of FIG. 1. However, the shape is not limited thereto and, for example, the buffer chamber 50 may have any three dimensional shape, such as a square column, a cylindrical column, an oval column, a sphere, an oval, and a combination thereof.

The capacity of the buffer chamber 50 is not particularly limited but can be set to 5% or more and 30% or lower based on the capacity of the containing chamber 10 from the respects of holding the gas discharged from the valve 30 and reducing the size of the liquid container 1.

It is preferable for the buffer chamber 50 to have the hole 52 which opens to the outside. The hole 52 functions as a gas discharge hole for discharging gas to the outside of the buffer chamber 50. Due to the fact that the hole 52 is provided as described above, the gas which is discharged from the valve 30 and flows into the buffer chamber 50 is easily discharged to the outside thereof. The hole 52 may have such an opening diameter that the liquid does not leak out to the outside of the buffer chamber 50 due to the surface tension of the liquid flowing into the buffer chamber 50 and can be set to 100 μm or more and 2 mm or lower, for example.

The member partitioning the buffer chamber 50 may be one formed with a flexible member (for example, film) or may be one formed with a member which does not have flexibility (for example, plastic plate). A material constituting the member partitioning the buffer chamber 50 is not particularly limited and known materials, such as nylon, polyolefin, polyester, aluminum oxide, and an ethylene-vinyl acetate copolymer, may be used.

In the buffer chamber 50, in order to hold the liquid leaking out of the containing chamber 10 through the valve 30, a liquid receiving member containing a foamed body (sponge and the like) formed with resin, such as urethane, fiber laminate, such as nonwoven fabric, and the like may be provided.

1.1.6. Hydrogen Absorption Substance

The liquid container 1 according to this embodiment may have a hydrogen absorption substance 60. Since the hydrogen absorption substance 60 has a function of absorbing the generated hydrogen, the deformation and the breakage of the containing chamber 10 due to the hydrogen generated in the containing chamber 10 can be suppressed. In particular, when liquid containing a base metal pigment and water is used as liquid to be stored in the containing chamber 10, hydrogen gas is likely to be generated due to a reaction of the base metal pigment and water. In such a case, the above-described effect is further demonstrated due to the fact that the hydrogen absorption substance is provided.

The hydrogen absorption substance is preferably disposed in at least either one of the containing chamber 10 and the decompression chamber 40. In the example of FIG. 1, an aspect in which the hydrogen absorption substance 60 is disposed in the containing chamber 10 is illustrated. When the hydrogen absorption substance 60 is disposed in the containing chamber 10 as illustrated therein, the hydrogen absorption substance 60 functions also as a stirrer of stirring the liquid in the containing chamber 10, and thus the aspect is preferable.

Although the case where one hydrogen absorption substance 60 is disposed in the containing chamber 10 is illustrated in the example of FIG. 1, two or more hydrogen absorption substances 60 may be disposed. Similarly, when the hydrogen absorption substance 60 is disposed in the decompression chamber 40, at least one hydrogen absorption substance 60 may be disposed and two or more hydrogen absorption substances 60 may be disposed.

The shape of the hydrogen absorption substance 60 is not particularly limited and is preferably a sphere from the viewpoint that, when used as a stirrer, the stirring efficiency increases. The volume of the hydrogen absorption substance 60 is not particularly limited and is preferably 1 $cm^3$ or more, more preferably 2 $cm^3$ or more, and still more preferably 2 $cm^3$ or more and 10 $cm^3$ or lower from the viewpoint of the stirring efficiency.

As the hydrogen absorption substance, any material may be used insofar as the material has a property of absorbing hydrogen. For example, metals, such as Ti, Zr, Pd, and Mg, and hydrogen absorption alloys, such as $AB_2$ type Laves phase alloys (for example, $MgZn_2$ and $ZrNi_2$), $AB_5$ type rare earth alloys (for example, $LaNi_5$ and $ReNi_5$), AB type titanium alloys (for example, TiFe and TiCo), $A_2B$ type Magnesium alloys (for example, $Mg_2Ni$ and $Mg_2Cu$), and BCC solid solution type alloys (for example, Ti—V, and Ti—Cr), can be used.

1.1.7. Packaging Body

Figure 2:
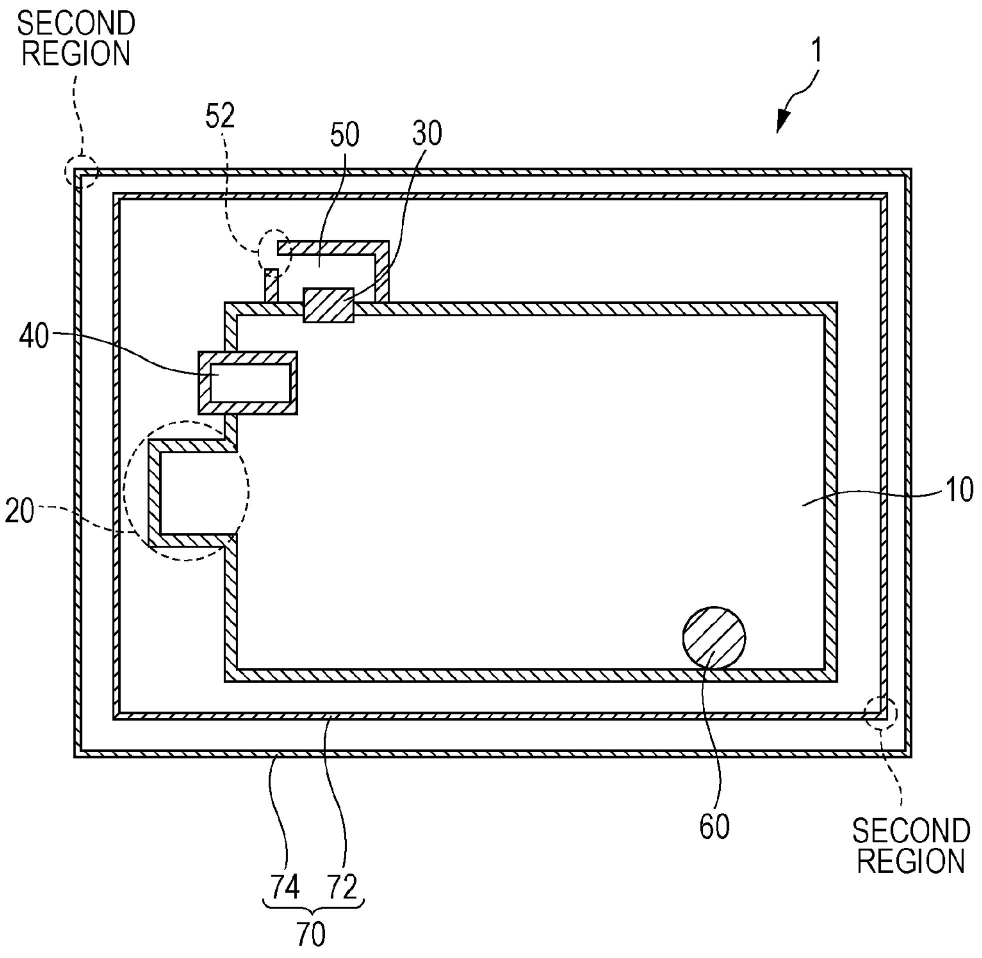
FIG. 2 is a schematic view of the cross section when the liquid container according to one embodiment of the invention is packaged with a packaging body.

FIG. 2 is a schematic view illustrating the cross section when packaging the liquid container 1 described above with a packaging body 70. The liquid container 1 according to this embodiment may be packaged with the packaging body 70 as illustrated therein. The packaging body 70 entirely packages the outside of the liquid container 1 and is used for protecting the liquid container 1 when transporting and storing the liquid container 1.

The packaging body 70 may be one formed with a flexible member (for example, film and the like) or may be one formed with a member which does not have flexibility (for example, plastic plate) and is preferably one formed with a flexible member, such as film, from the respect that the packaging efficiency is excellent.

The packaging body 70 may be one containing a single material or may be one containing a plurality of materials in combination. As a specific example, when the packaging body 70 is a film, the case where the packaging body 70 contains a film of one layer, the case where the packaging body 70 contains a film of two or more layers, and the like are mentioned. When the packaging body 70 contains a film of two or more layers, one obtained by bonding each layer with an adhesive and the like or one obtained by bonding each layer with heat or the like may be acceptable.

The hydrogen penetration amount of the packaging body 70 is preferably equal to or larger than the hydrogen penetration amount of the member partitioning the containing chamber 10 and specifically can be set to 0.01 ml/cm$^2$·day·atm or more and further 0.05 ml/cm$^2$·day·atm or more. Thus, the gas (particularly hydrogen) discharged from the containing chamber 10 to be present between the packaging body 70 and the liquid container 1 is easily discharged to the outside of the packaging body 70. Therefore, the deformation, the breakage, and the like of the packaging body 70 can be suppressed. The hydrogen penetration amount of each member can be measured by the same method as the method mentioned in the description of the member constituting the containing chamber 10 above.

The vapor (water) penetration amount of the packaging body 70 is preferably lower than the hydrogen penetration amount under a 25° C. environment (comparison per day under a 25° C. environment). The vapor (water) penetration amount of the packaging body 70 is preferably lower than the vapor (water) penetration amount of the member partitioning the containing chamber 10. Specifically, the vapor (water) penetration amount of the packaging body under a 25° C. environment is preferably 0.00005 g/cm$^2$·day·atm or more and 0.008 g/cm$^2$·day·atm or lower per day and more preferably 0.0008 g/cm$^2$·day·atm or more and 0.005 g/cm$^2$·day·atm or lower per day. Thus, the emission of moisture to the outside of the packaging body 70 can be suppressed and the storage stability of the liquid can be improved. The measurement of the penetration amount of water (vapor) of the packaging body can be performed by the same method as the method mentioned in the description of the member constituting the containing chamber 10 above.

As materials constituting the packaging body 70 satisfying the penetration amount of water (vapor) mentioned above while satisfying the hydrogen penetration amount mentioned above, alumina, polyester, polyethylene, and the like are mentioned, for example.

The thickness of the packaging body 70 is not particularly limited, and can be set to 50 μm or more and 500 μm or lower, for example.

A method of packaging the liquid container 1 with the packaging body 70 is not particularly limited and includes, for example, a method including inserting the liquid container 1 from an opening portion of the packaging body 70 having a bag shape which is sealed in the three directions, and then sealing the opening portion, a method of enfolding the packaging body 70 formed with a sheet-like film thereinto to cover the liquid container 1, and the like.

The packaging body 70 preferably has a first region and a second region where the pressure resistance is lower than that of the first region. Thus, the internal pressure of the packaging body 70 is increased due to the gas discharged from the liquid container 1. Even when the packaging body 70 is provisionally damaged, the second region is preferentially damaged than the first region, so that a rapid rapture of the packaging body 70 can be prevented.

A method of reducing the pressure resistance of the second region to be lower than the pressure resistance of the first region is not particularly limited. For example, the reduction can be achieved by reducing the thickness of the second region as compared with the first region, using a member having a pressure resistance lower than that of the first member as a member constituting the second region, cutting the second region, reducing the adhesion conditions (for example, temperature) of a film member, and the like.

The liquid container 1 may be packaged with at least one packaging body or may be packaged with two or more packaging bodies. In the example of FIG. 2, the packaging body 70 includes a first packaging body 72 and a second packaging body 74 which packages the first packaging body 72. Due to the fact that the liquid container 1 is packaged with two or more packaging bodies as illustrated therein, there are advantages in that the protection effect of the liquid container 1 increases; even when the first packaging body 72 is provisionally damaged by the gas discharged from the liquid container 1, the liquid can be prevented from leaking out to the outside (i.e., outside of the second packaging body 74) of the packaging body 70; and the safety can be further improved.

Moreover, both the first packaging body 72 and the second packaging body 74 may have a first region and a second region where the pressure resistance is lower than that of the first region. In this case, even when the breakage of the second packaging body 74 provisionally occurs following the breakage of the first packaging body 72 due to the gas discharged from the liquid container 1, the second region of the first packaging body 72 and the second region of the second packaging body 74 are preferentially damaged. In such a case, it is preferable that the second region of the second packaging body 74 is provided in such a manner as to open in a direction other than the downward direction. Such an aspect is preferable in that the leaking liquid is more difficult to leak out to the outside of the second packaging body 74. Furthermore, as a more preferable aspect, the second region of the second packaging body 74 is provided in such a manner as to open in the upward direction.

On the other hand, when the second region of the first packaging body 72 and the second region of the second packaging body 74 are provided at different positions with the containing chamber 1 interposed therebetween, the liquid leaking out of the second region of the first packaging body is difficult to leak out to the outside of the second packaging body 74, and thus such an aspect is preferable.

As another preferable aspect, the second region of the first packaging body 72 and the second region of the second packaging body 74 are provided in such a manner as to open in different directions. For example, when the second region of the first packaging body 72 is provided in such a manner as to open in the downward direction, it is preferable that the second region of the second packaging body 74 is provided in such a manner as to open in the transverse direction or in the upward direction. As the most suitable combination in the case of opening in different directions, the second region of the first packaging body 72 opens in the downward direction and the second region of the second packaging body 74 opens in the upward direction. The combination is preferable in the respect that the leakage of the liquid can be further suppressed.

As the position relationship of the second region of the first packaging body 72 and the second region of the second packaging body 74, it is preferable that, when connecting the second regions by the straight line passing through the containing chamber 10, the second region of the first packaging body 72 and the second region of the second packaging body 74 are disposed in such a manner that the distance of the straight line (line segment) reaches the maximum. Thus, the liquid is more difficult to leak out to the outside of the packaging body 70.

In order to notably demonstrate the above-described effect, it is preferable to specify the storage manner of the liquid container 1 to users. For example, by indicating "Store with this side up", "Not store with this side down", and the like on the member partitioning the containing chamber 10, the first packaging body, or the second packaging body to specify the storage manner to users, the above-described effect is easily notably demonstrated. The indication manner is not limited to the direct indication and indication in other media, such as a manual, may be acceptable.

When using the liquid container 1 as an ink pack to be stored in a cartridge described later, the packaging body 70 may be one packaging both the cartridge and the liquid container (ink pack).

1.2. Liquid

The containing chamber 10 of the liquid container 1 according to this embodiment contains liquid which temporarily generates gas due to a chemical change of the contained components. Hereinafter, the description is given taking an ink composition which is one aspect of the liquid according to this embodiment as an example. The ink composition according to this embodiment can be used as ink for a liquid consumption apparatus (for example, ink jet type printing apparatus) described later.

1.2.1. Coloring Material

The ink composition according to this embodiment can contain coloring materials (for example, dyes, pigments, and the like). As the dyes, direct dyes, acid dyes, edible dyes, basic dyes, reactive dyes, disperse dyes, vat dyes, soluble vat dyes, reactive dispersion dyes, and the like are mentioned, for example. As the pigments, azo pigments, such as insoluble azo pigments, condensed azo pigments, azo lake, and chelate azo pigments, polycyclic pigments, such as phthalocyanine pigments, perylene and perinone pigments, anthraquinone pigments, quinacridone pigments, dioxane pigments, thioindigo pigments, isoindolinone pigments, and quinophthalone pigments, dye chelates, dye lake, nitro pigments, nitroso pigments, aniline black, daylight fluorescent pigments, carbon black, base metal pigments, and the like are mentioned.

The coloring materials mentioned above sometimes temporarily generate gas due to chemical changes (decomposition, a reaction with other components, and the like). In particular, the base metal pigment mentioned as a pigment is likely to react to the moisture contained in the ink composition to generate hydrogen gas. Even in such a case, by the use of the liquid container 1, the hydrogen gas generated in the containing chamber 10 can be discharged to the outside. Therefore, the breakage and the deformation of the liquid container 1 can be suppressed.

The base metal pigments include one selected from the group consisting of aluminum, iron, copper, and nickel or alloys of two or more kinds thereof, for example. Among the above, aluminum or an aluminum alloy is preferable from the viewpoint of securing metallic gloss and from the viewpoint of cost.

In an aspect of the invention, the pigment refers to an aggregate of pigment particles containing a plurality of pigment particles. The pigment particles constituting the base metal pigment preferably have a plate-like shape from the respect that good metallic gloss is easily obtained.

When the 50% average particle diameter R50 (hereinafter also simply referred to as "R50") of the equivalent circle diameter determined from the area of the projected image of the pigment particles obtained by a particle image analysis apparatus in the base metal pigment is 0.3 μm or more, good metallic gloss is obtained. Furthermore, it is preferable to use a base metal pigment having R50 of 0.5 μm or more and 3 μm or lower and having a thickness (Z) of 1 nm or more and lower than 100 nm. Due to the fact that the R50 and the thickness (Z) of the base metal pigment are in the range mentioned above, the metallic gloss and the recording stability become favorable.

A more preferable aspect of the R50 of the base metal pigment according to this embodiment is 0.5 μm or more and 1.5 μm or lower. Due to the fact that the R50 is in the range mentioned above, the recording stability sometimes becomes more favorable.

The "equivalent circle diameter" is a diameter of a circle when the circle is assumed to have the same area as the area of the projected image of the pigment particles obtained using a particle image analysis apparatus. For example, when the projected image of the pigment particles is a polygon, the diameter of a circle obtained by converting the projected image to a circle is referred to as an equivalent circle diameter of the pigment particles.

The area and the equivalent circle diameter of the projected image of the pigment particles constituting the base metal pigment can be measured using a particle image analysis apparatus. As the particle image analysis apparatus, a flow type particle image analysis apparatus FPIA-2100, FPIA-3000, and FPIA-3000S (all manufactured by Sysmex Corp.) and the like are mentioned, for example. The average particle diameter of the equivalent circle diameter is a particle diameter in terms of number. As an example of a measurement method using FPIA-3000 or 3000S, a measurement in an HPF measurement mode using a high magnification image pick-up unit is mentioned.

The particle size distribution (CV value) of the pigment particles constituting the base metal pigment can be determined from the following expression (1).

$$CV\text{ value}=\text{Standard deviation of particle size distribution/Average value of particle diameter}\times 100 \quad (1)$$

Herein, the obtained CV value is preferably 60 or lower, more preferably 50 or lower, and particularly preferably 40 or lower. By selecting the base metal pigment having a CV value of 60 or lower, the effect of achieving excellent recording stability is obtained.

The maximum particle diameter of the equivalent circle diameter determined from the area of the projected image of the pigment particles constituting the base metal pigment is preferably 3 μm or lower. When the base metal pigment having a maximum particle diameter of 3 μm or lower is used, clogging in a nozzle opening portion or an ink flow passage can be effectively suppressed when used for an ink jet type recording apparatus.

A preferable aspect of the thickness (Z) of the base metal pigment is 10 nm or more and 50 nm or lower and more preferably 10 nm or more and 30 nm or lower. Due to the fact that the thickness (Z) is in the range mentioned above, even when a protective film (described later) is formed on the surface of the base metal pigment, there is a tendency that the metallic gloss is not impaired but becomes favorable.

The thickness (Z) can be measured by observing the cross section of the pigment particles using an electron microscope, for example. For the electron microscope, a transmission electron microscope (TEM, JEOL JEM-2000EX), a field-emission scanning electron microscope (FE-SEM, Hitachi S-4700), a scanning transmission electron microscope (STEM, "HD-2000" manufactured by Hitachi High-Technologies Corporation.), and the like can be used. The thickness (Z) means an average thickness and specifically refers to an arithmetic mean value of the thickness obtained by selecting ten pigment particles constituting the base metal pigment, and then individually measuring the same.

It is preferable for the base metal pigment to have a protective film on the surface in order to inhibit a reaction with the moisture contained in the ink composition. The protective film is not particularly limited in the material insofar as the material improves the water resistance of the base metal pigment. For example, a film containing inorganic oxide formed using alkoxysilane having a silicon atom in the structure (for example, tetraethoxysilane), polysilazane, a fluorine material, and the like, a film using a fluorine material, and the like are preferable. Among the above, it is preferable to use alkoxysilane from the respect that a uniform and flat film can be formed on the surface of the base metal pigment. In particular, when using an aluminum pigment containing aluminum or an aluminum alloy, tetraethoxysilane is more preferably used from the respect that a silica film excellent in adhesiveness with the aluminum pigment can be formed.

A method of producing the protective film is not particularly limited and the description of United States Patent Application Publication No. 2010/0256284, Specification, United States Patent Application Publication No. 2010/0256283 Specification, and the like can be utilized, for example.

The thickness of the protective film is preferably 1 nm or more and 20 nm or lower, more preferably 3 nm or more and 10 nm or lower, and particularly preferably 1 nm or more and 9 nm or lower. When the thickness of the protective film is in the range mentioned above, particularly equal to or lower than the lower limit value mentioned above, the water resistance of the base metal pigment becomes favorable. When the thickness of the protective film is equal to or lower than the lower limit mentioned above, the water resistance can be favorable while suppressing a reduction in metallic gloss.

The thickness of the protective film refers to a thickness of the protective film formed on one surface of the base metal pigment in the thickness direction of the base metal pigment. The thickness of the protective film can be measured by observing the cross section of the base metal pigment using an electron microscope (for example, TEM, STEM, SEM, and FE-SEM).

The concentration of the base metal pigment in the ink composition is preferably 0.1% by mass or more and 5.0% by mass or lower, more preferably 0.1% by mass or more and 3.0% by mass or lower, still more preferably 0.25% by mass or more and 2.5% by mass or lower, and particularly preferably 0.5% by mass or more and 2.0% by mass or lower based on the total mass of the ink composition.

1.2.2. Aqueous Medium

The ink composition according to this embodiment may contain an aqueous medium. The aqueous medium may be a medium containing water as the main component. For water, it is preferable to use pure water or ultrapure water, such as ion exchanged water, ultrafiltration water, reverse osmosis water, and distilled water. In particular, water obtained by sterilizing the water mentioned above by radiation of ultraviolet rays, addition of hydrogen peroxide, and the like can suppress the generation of mold or bacteria over a long period of time, and thus is preferable. The content of the aqueous medium is preferably 20% by mass or more, more preferably 20% by mass or more and 60% by mass or lower, and still more preferably 40% by mass or more and 60% by mass or lower based on the total mass of the ink composition.

1.2.3. Other Components

Organic Solvent

The ink composition according to this embodiment may contain an organic solvent. Mentioned as the organic solvent are, for example, alcohols (methyl alcohol, ethyl alcohol, propyl alcohol, butyl alcohol, isopropyl alcohol, alcohol fluoride, and the like), ketones (acetone, methyl ethyl ketone, cyclohexanone, and the like), carboxylate esters (methyl acetate, ethyl acetate, propyl acetate, butyl acetate, methyl propionate, ethyl propionate, and the like), ethers (diethyl ether, dipropyl ether, tetrahydrofuran, dioxane, and the like), alkanediols (1,2-alkanediols having carbon atoms of 4 or more and 8 or lower, such as 1,2-butanediol, 1,2-pentanediol, 1,2-hexanediol, 1,2-heptanediol, and 1,2-octanediol), polyhydric alcohols (ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylol ethane, trimethylol propane, and the like), glycol ether solvents (alkylene glycol monoethers, such as triethylene glycol monobutyl ether, alkylene glycol diethers, such as diethylene glycol diethylether, and the like), pyrolidone derivatives (N-methyl-2-pyrolidone, N-ethyl-2-pyrolidone, N-vinyl-2-pyrolidone, 2-pyrolidone, 5-methyl-2-pyrolidone, and the like), and the like.

Among the above, when using an aluminum pigment, it is preferable to use at least one kind of polyhydric alcohols and glycol ethers from the viewpoint that the dispersion stability of the aluminum pigment is excellent.

Moreover, the polyhydric alcohols can suppress drying of the ink composition and can suppress clogging of the ink composition in a head when the ink composition is applied to a liquid ejecting apparatus, such as an ink jet recording apparatus, for example. Alkanediol can be preferably used from the viewpoint of improving the wettability to a target recording surface of a recording medium and the like and improving the permeability of ink thereinto.

When containing the organic solvent, the content thereof is preferably 30% by mass or more, more preferably 30% by mass or more and 80% by mass or lower, still more preferably 40% by mass or more and 80% by mass or lower, and particularly preferably 50% by mass or more and 80% by mass or lower based on the total mass of the ink composition.

Basic Catalyst

The ink composition according to this embodiment may contain a basic catalyst. The basic catalyst can be added in a reaction of the basic metal pigment (for example, aluminum pigment) with a material for forming a coating film (for example, TEOS). The basic catalyst includes, for example, ammonia, trialkylamine, ethanolamine, sodium hydroxide, potassium hydroxide, urea, choline, tetraalkyl ammonium hydroxide, and the like.

Surfactant

The ink composition according to this embodiment may contain a surfactant. By adding a surfactant, the dispersibility of a water-resistant metal pigment can be sometimes improved. As the surfactant, any known surfactant, such as anionic surfactants, cationic surfactants, nonionic surfactants, amphoteric surfactants, and polymer surfactants, can be used. An acetylene glycol surfactant and a polysiloxane surfactant which are nonionic surfactants can be preferably used from the respect that the wettability to a target recording surface of a recording medium and the like can be improved and the permeability of ink thereinto can be improved.

Tertiary Amine

It is preferable for the ink composition according to this embodiment to contain tertiary amine. The tertiary amine can sometimes improve the dispersibility of the base metal pigment by the steric hindrance effect and the pH adjustment action. As the tertiary amine, hydroxylamines, such as triethanolamine, tripropanolamine, tributanolamine, N,N-dimethyl-2-aminoethanol, and N,N-diethyl-2-aminoethanol, are mentioned, for example. Among the above, triethanolamine and tripropanolamine are preferable in the respect that the water dispersibility can be further improved and triethanolamine is more preferable in the respect that the storage stability can be improved in addition to the water dispersibility.

When containing the tertiary amine, the content thereof is preferably 0.1% by mass or more and 2% by mass or lower, more preferably 0.3% by mass or more and 1.8% by mass or lower, and still more preferably 0.4% by mass or more and 1.6% by mass or lower based on the total mass of the ink composition. When the content of the tertiary amine is in the range mentioned above, the above-described effects tend to further improve.

Resins

The ink composition according to this embodiment may contain resins. The resins have a function of firmly fixing the base metal pigment onto a recording medium. The resins include, for example, homopolymers or copolymers of acrylic acid, acrylate ester, methacrylic acid, methacrylate ester, acrylonitrile, cyanoacrylate, acryl amide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride, urethane resin, fluororesin, natural resin, and the like. The copolymers mentioned above can be used in any shape of a random copolymer, a block copolymer, an alternating copolymer, and a graft copolymer.

PH Adjuster

The ink composition according to this embodiment may contain a pH adjuster. Mentioned as the pH adjuster are, for example, potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogencarbonate, and the like.

Buffer Solution

The ink composition according to this embodiment may contain a buffer solution. The buffer solution can be used in the respect that the fluctuation of the pH of the ink composition can be made small and the pH can be maintained in a desired range. Thus, problems resulting from the pH of a dispersion liquid, such as the generation of gas associated with the reaction of the base metal pigment with the aqueous medium and the elution of the base metal pigment, can be sometimes suppressed.

As the buffer solution, any known buffer solution can be used insofar as the pH of the ink composition can be maintained in the range of 5.0 or more and 8.5 or lower. For example, good buffers, such as 4-(2-hydroxyethyl)-1-piperazine ethane sulfonate (HEPES), morpholino ethane sulfonate (MES), carbamoylmethylimino bisacetic acid (ADA), piperazine-1,4-bis(2-ethane sulfonate) (PIPES), N-(2-acetamide)-2-amino ethane sulfonate (ACES), colamine chloride, N,N-bis(2-hydroxyethyl)-2-amino ethane sulfonate (BES), N-tris(hydroxymethyl)methyl-2-amino ethane sulfonate (TES), acetamide glycine, tricine, glycine amide, and bicin, phosphate buffer solutions, tris buffer solutions, and the like are mentioned.

Others

The ink composition according to this embodiment can contain additives, such as a fixing agent, such as water-soluble rosin, an antifungal/antiseptic agent, such as sodium benzoate, an antioxidant/ultraviolet absorber, such as allophanates, a chelating agent, and an oxygen absorbent. These additives can also be used singly or in combination of two or more kinds thereof.

2. Cartridge

The liquid container 1 described above can be suitably used for an ink jet type printing apparatus which is one aspect of a liquid consumption apparatus. In this case, the liquid container 1 can be accommodated in a cartridge to be used.

Hereinafter, a cartridge capable of accommodating the liquid container 1 and an ink jet type printing apparatus carrying the same are specifically described with reference to FIG. 3 to FIG. 8.

Figure 3:
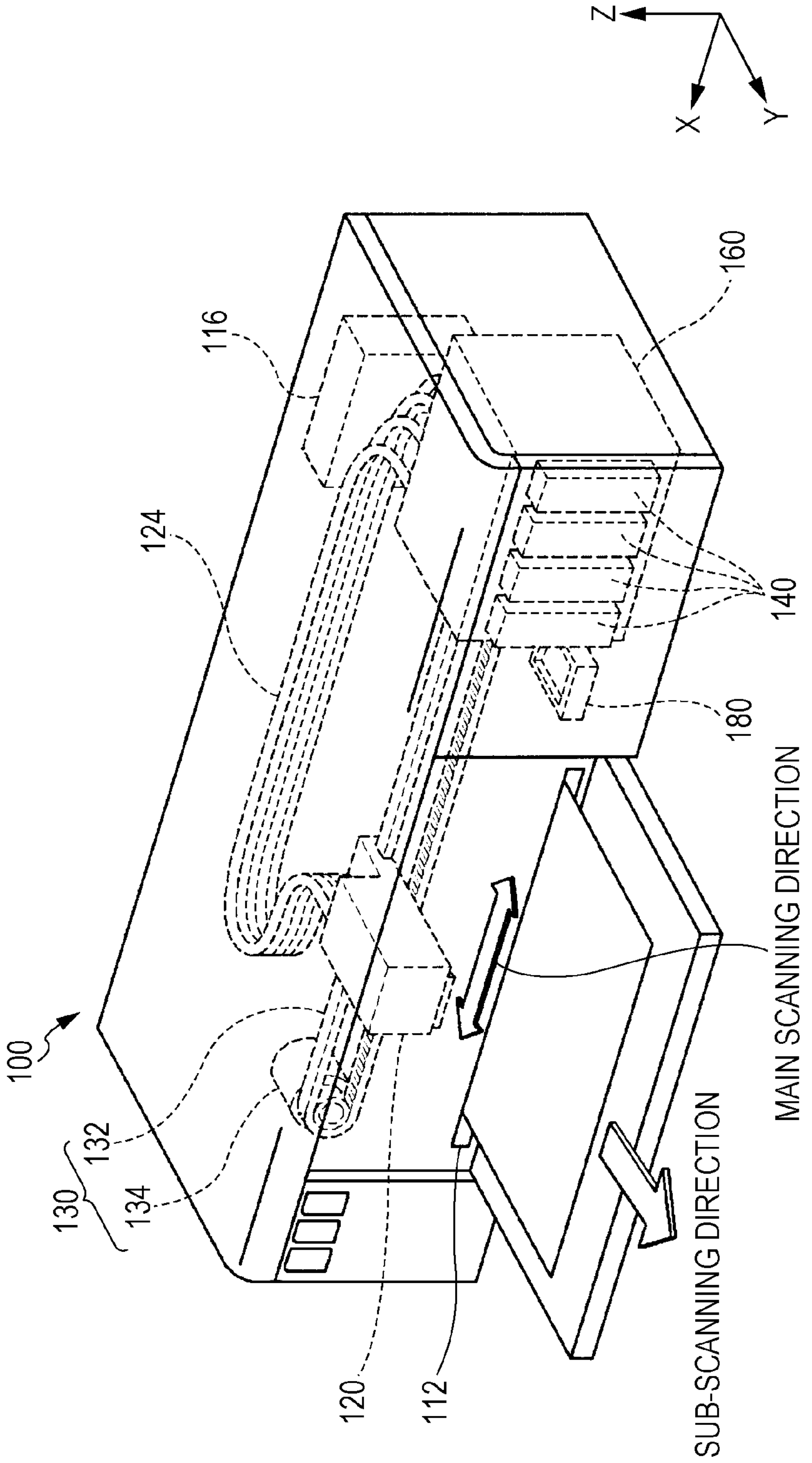
FIG. 3 is a view illustrating the schematic structure of a printing apparatus carrying the liquid container according to one embodiment of the invention.

FIG. 3 is a view illustrating the schematic structure of an ink jet type printing apparatus to which a cartridge as a liquid container is to be attached. In FIG. 3, the XYZ axes which are orthogonal to each other are illustrated. The XYZ axes of FIG. 3 correspond to the XYZ axes of other figures, and the XYZ axes are illustrated in the figures referred to hereinafter. In this embodiment, in the use manner of a printing apparatus 100, the Z axis is the vertical direction (the gravity direction), the Y axis is a direction in which cartridges 140 are attached to/removed from a cartridge holder 160, and the X axis is a direction in which the plurality of cartridges 140 are disposed side by side. More specifically, the +Z axial direction is a vertically upward direction, the −Z axial direction is a vertically downward direction, the +Y axial direction is a direction of removing the cartridges 140, the −Y axial direction is a direction of inserting the cartridges 140, the +X axial direction is a direction of the side of a surface to which a predetermined label LB (FIG. 6) is attached, and the −X axial direction is a direction of the back surface thereof. In the following description, the +Z axial direction refers to the top, the −Z axial direction refers to the bottom, the +Y axial direction refers to the front, and the −Y axial direction refers to the back in some cases.

The printing apparatus 100 as a liquid consumption apparatus has an appearance of an approximately box shape. On the front surface of the printing apparatus 100, a sheet discharge port 112 is provided. Moreover, on the back surface of the printing apparatus 100, a paper feed tray, which is not illustrated, is provided. By setting a print sheet to the paper feed tray, and performing a print operation, the print sheet is fed from the paper feed tray. Then, an image and the like are printed on the surface inside the apparatus, and then the print sheet is discharged from the sheet discharge port 112.

The printing apparatus 100 has an ejection head 120 which forms ink dots on a print sheet while moving back and forth in the main scanning direction and a drive mechanism 130 of causing the ejection head 120 to move back and forth thereinside. On the bottom surface side (side facing the print sheet) of the ejection head 120, a plurality of ejection nozzles (not illustrated) are provided, and ink is ejected to the print sheet from the ejection nozzles.

The ink ejected from the ejection nozzles is contained in the cartridges 140. The cartridges 140 are attached to the cartridge holder 160 provided in a position different from the position where the ejection head 120 is provided. The ink in the cartridges 140 is supplied to the ejection head 120 through ink tubes 124. As the printing apparatus 100 according to this embodiment, a printer (a so-called off-carriage type printer) in which the cartridges 140 are fixed is illustrated as an example. However, the invention is not limited thereto, and a printer (a so-called on-carriage type printer) of a type in which the cartridges 140 are disposed on the ejection head 120 and move back and forth with the ejection head 120 may be acceptable.

The ejection head 120 is provided with the ejection nozzle for each kind of ink. To each ejection nozzle, the ink in the corresponding cartridge 140 is supplied through the ink tube 124 provided for each kind of ink. In this embodiment, the printing apparatus 100 performs printing using four kinds of ink. However, printing may be performed using five or more kinds of ink or three or more of kinds of ink. The liquid container 1 may be accommodated in at least one of the cartridges 140 to be used.

The drive mechanism 130 which causes the ejection head 120 to move back and forth has a timing belt 132 in which a plurality of teeth are formed thereinside, a drive motor 134 for driving the timing belt 132, and the like. The timing belt 132 is partially fixed to the ejection head 120. When the timing belt 132 is driven, the ejection head 120 is caused to move back and forth in the main scanning direction while being guided with a guide rail (not illustrated) which extends in the main scanning direction.

In a position other than the printing region in which the ejection head 120 is caused to move in the main scanning direction, a region referred to as a home position is provided. At the home position, a maintenance mechanism is mounted. The maintenance mechanism has a cap 180 which is pressed against the surface (nozzle surface) which is the bottom surface side of the ejection head 120 and on which the ejection nozzles are provided to form a closed space in such a manner as to surround the ejection nozzles, a moving up and down mechanism (not illustrated) which moves up and down the cap 180 in order to press the cap 180 against the nozzle surface of the ejection head 120, a suction pump (not illustrated) which introduces negative pressure into the closed space formed by the cap 180 being pressed against the nozzle surface of the ejection head 120, and the like.

Inside the printing apparatus 100, a paper feed mechanism (not illustrated) for feeding a print sheet and a control portion 116 which controls the entire operation of the printing apparatus 100 are provided. The control portion 116 has a CPU, a ROM, and a RAM. All of the operations of causing the ejection head 120 to move back and forth, the operation of feeding a print sheet, the operation of ejecting ink from the ejection nozzles, the operation of performing maintenance in such a manner that printing can be normally performed, and the like are controlled by the control portion 116.

Figure 4:
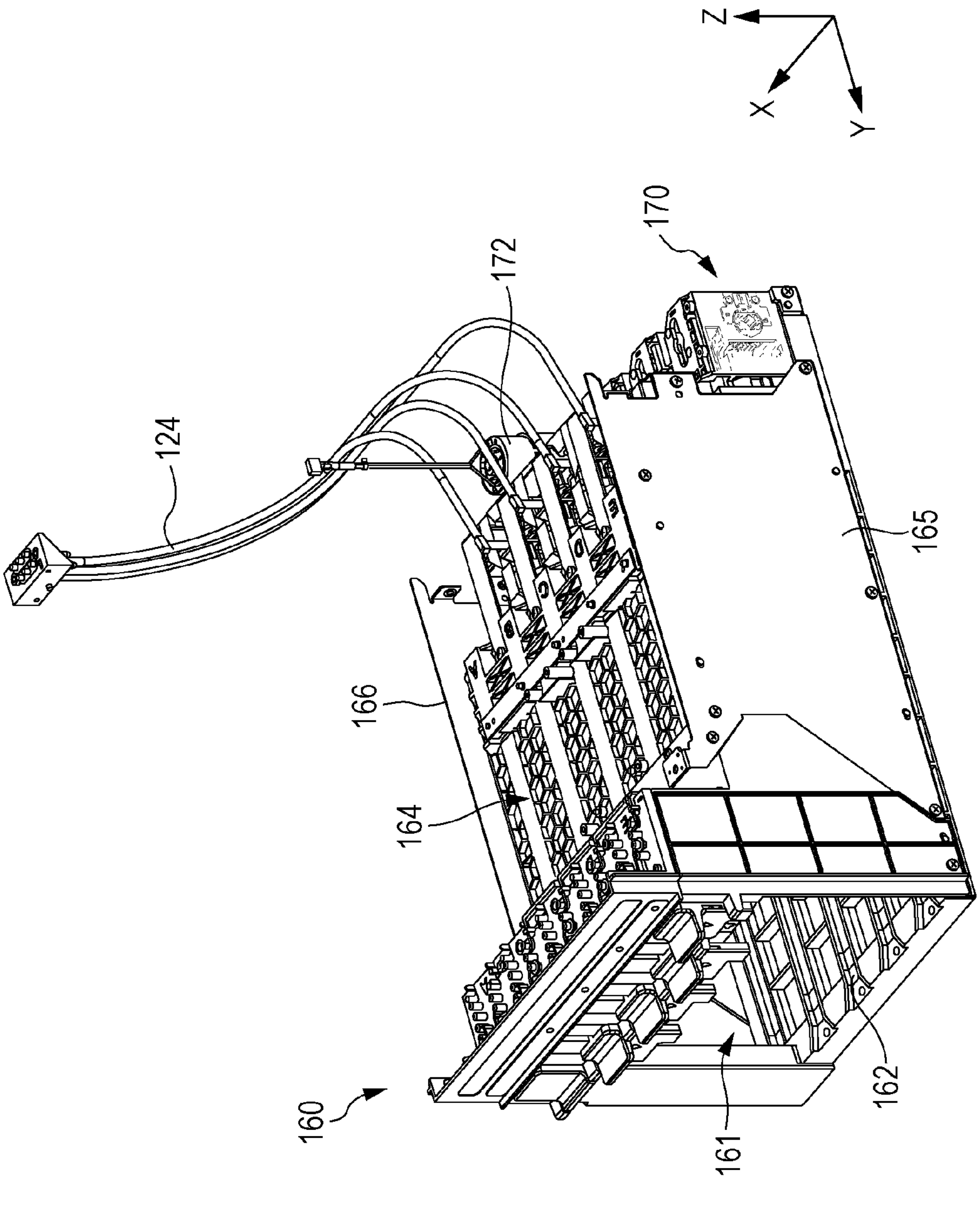
FIG. 4 is a perspective view of the appearance of a cartridge holder carrying cartridges containing the liquid container according to one embodiment of the invention.

FIG. 4 is a detailed perspective view of the appearance the cartridge holder 160. The cartridge holder 60 is provided with a slot 161 into which the cartridges 140 are inserted from +Y axial direction to the −Y axial direction. The slot 161 is provided with guide grooves 162 along the Y axial direction on the surface (upper surface) on the +Z axial direction side and the surface (bottom surface) on the −Z axial direction side for each cartridge 140. When attaching the cartridge 140, rail portions 413 and 414 (FIG. 5) provided on the surface (upper surface) on the +Z axial direction side and the surface (bottom surface) on the −Z axial direction side of the cartridge 140, respectively, are fitted into the respective guide grooves 162 and the cartridge 140 slides.

At the end portion in the −Y axial direction of the cartridge holder 160, a pump unit 170 for sucking ink from the cartridge 140 is provided for each cartridge 140. To each pump unit 170, a pump drive motor 172 for driving the pump unit 170 is connected. The ink sucked by each pump unit 170 is supplied to the ejection head 120 through the ink tube 124.

Figure 5:
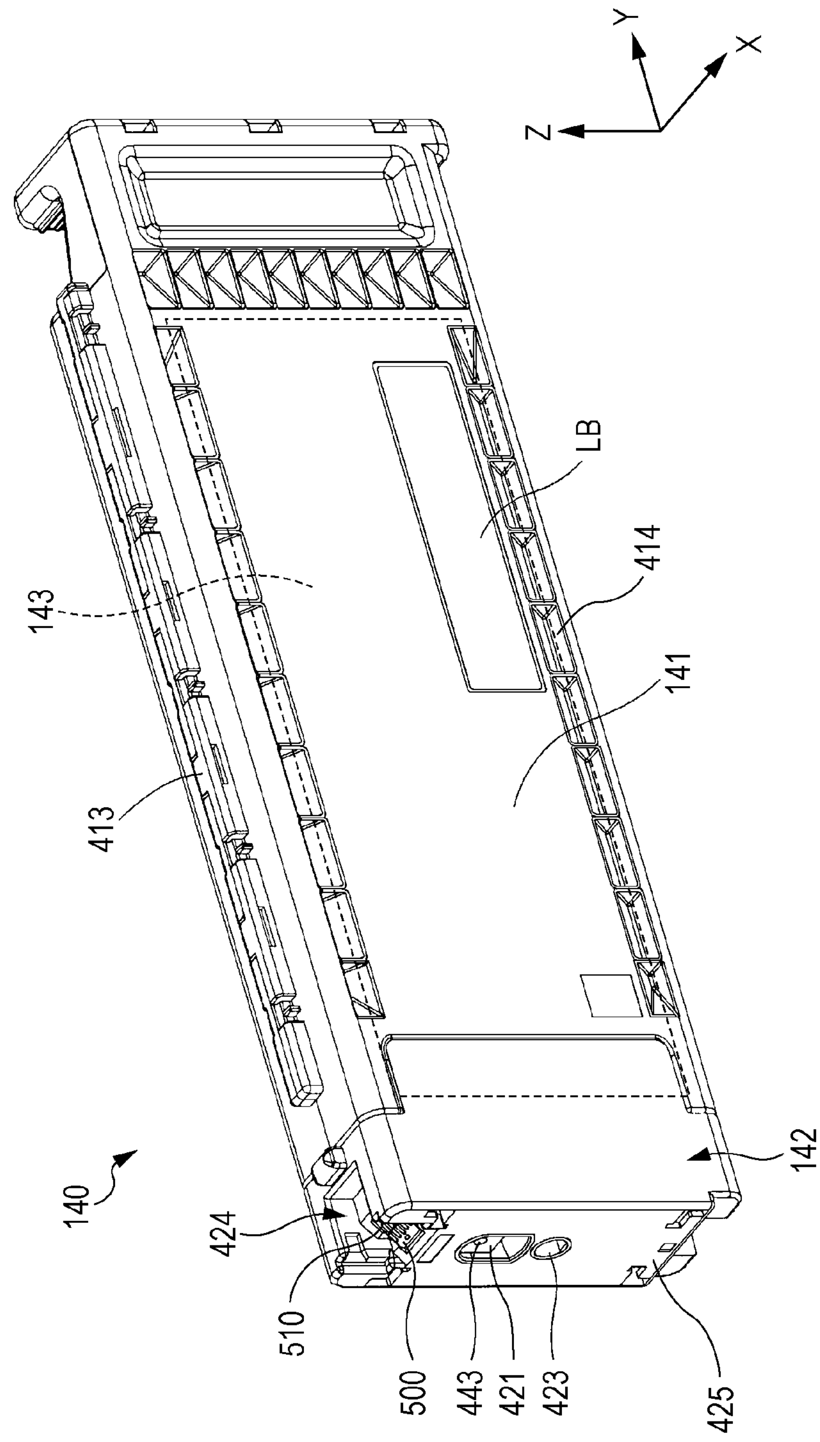
FIG. 5 is a perspective view of the appearance of the cartridge containing the liquid container according to one embodiment of the invention.
Figure 6:
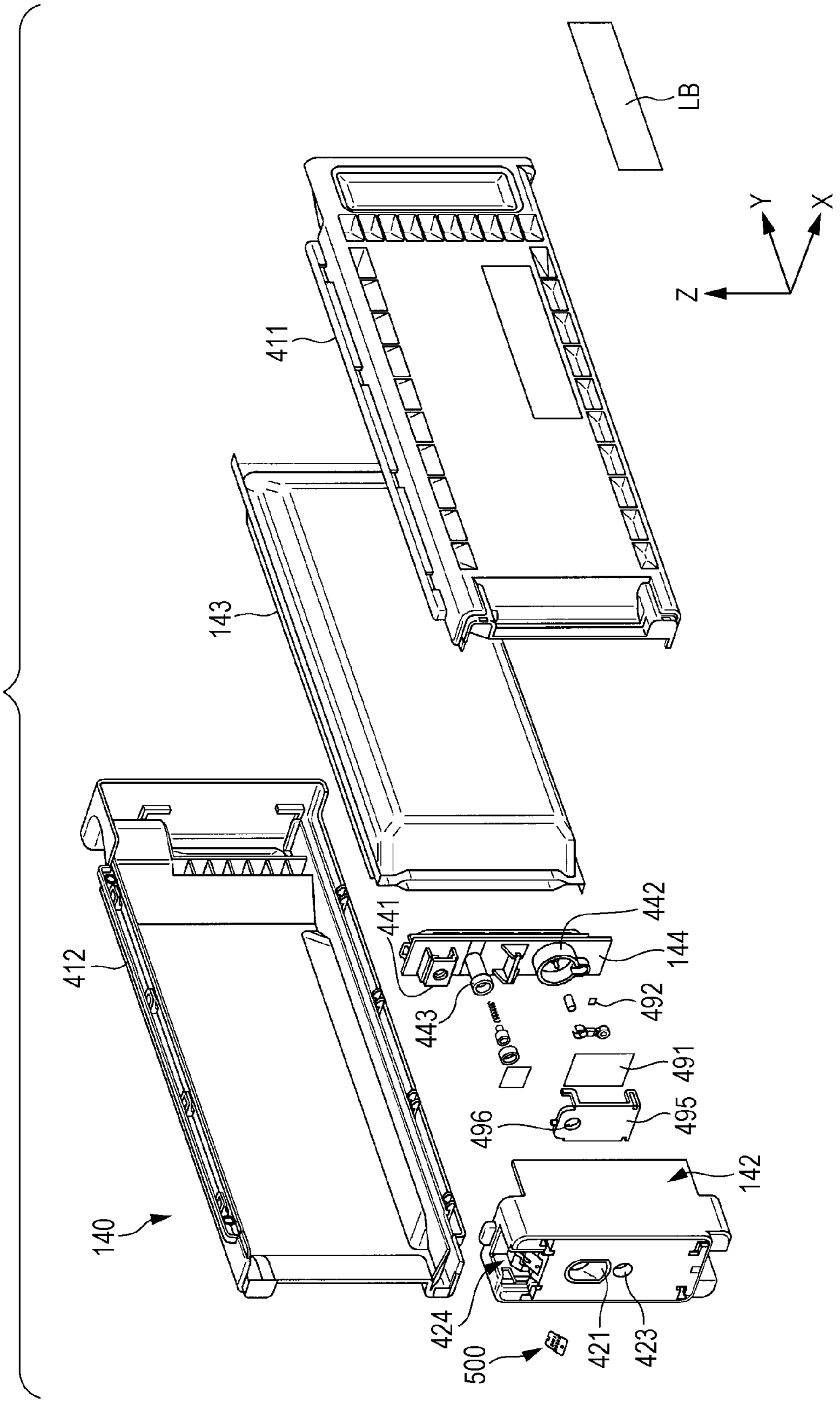
FIG. 6 is an exploded perspective view of the cartridge containing the liquid container according to one embodiment of the invention.

FIG. 5 is a perspective view of the appearance of the cartridge 140. FIG. 6 is an exploded perspective view of the cartridge 140. The cartridge 140 has a case member 141, a lid member 142, a flexible ink pack 143, and a liquid flow passage member 144. The ink pack 143 is a so-called pillow type bag, and the liquid flow passage member 144 is fixed to an opening in the −Y axial direction.

The ink pack 143 is equivalent to the "liquid container" of this application and has the same structure as that of the liquid container 1 described above. The structure of the liquid container is already described with reference to FIG. 1. Therefore, the detailed structure thereof is omitted in FIG. 5.

The case member 141 has a right case 411 and a left case 412. The label LB is stuck to the surface on the +X axial direction side of the right case 411. The case member 141 is provided with the rail portions 413 and 414 along the Y axial direction on the surface in the +Z axial direction and on the surface in the −Z axial direction, respectively. These rail portions 413 and 414 are fitted into the guide grooves 162 of the cartridge holder 160 illustrated in FIG. 4 when attaching the cartridge 140 into the cartridge holder 160.

The liquid flow passage member 144 is a member for supplying the ink charged in the ink pack 143 to the printing apparatus 100. The liquid flow passage member 144 is fixed in the −Y axial direction (i.e., surface on which the circulation port 20 is provided in FIG. 1) of the ink pack 143. The liquid flow passage member 144 is accommodated in the lid member 142 when the lid member 142 is attached to an opening portion at the end portion in the +Y axial direction of the case member 141. The ink pack 143 is accommodated between the right case 411 and the left case 412 constituting the case member 141.

On the surface on the +Y axial direction side of the liquid flow passage member 144 (surface opposite to the ink pack 143), an ink charging port 441, an ink supply pipe 443, and an ink detection chamber 442 are provided in this order from the end portion in the +Z axial direction to the −Z axial direction. The ink charging port 441 communicates with the inside of the ink pack 143 (i.e., the containing chamber 10 in FIG. 1) and is provided for charging ink into the ink pack 143. After ink is charged into the ink pack 143 through the ink charging port 441, the ink charging port 441 is sealed. When the ink pack 143 is charged with ink beforehand, the ink charging port 441 becomes unnecessary.

An air introduction hole (not illustrated) may be provided in the surface on the +Y axial direction side of the liquid flow passage member 144. The air introduction hole is provided for introducing the air into the cartridge 140 under pressure with a pump or the like. Due to the fact that the ink pack 143 (specifically the containing chamber 10) is pressurized from the outside by the air introduced from the air introduction hole under pressure, even when the ink remaining amount in the ink pack 143 decreases, the ink can be favorably discharged. By providing the air introduction hole, the gas discharged from the ink pack 143 (the liquid container 1) is discharged to the outside of the cartridge 140 through the air introduction hole.

The ink detection chamber 442 communicates with the inside of the ink pack 143 (i.e., the containing chamber 10 in FIG. 1) and is used for detecting the remaining state of the ink in the ink pack 143. A flexible film member 491 is provided on the surface on the +Y axial direction side of the ink detection chamber 442. The ink flows into the ink detection chamber 442 from the inside of the ink pack 143 through a check valve 492.

The ink supply pipe 443 is used for supplying ink to the printing apparatus 100. The ink supply pipe 443 communicates with the ink detection chamber 442 through the flow passage formed inside the liquid flow passage member 144. Therefore, the ink flows into the ink supply pipe 443 from the inside of the ink pack 143 through the ink detection chamber 442. In this embodiment, the cartridge 140 has the ink detection chamber 442 but a structure in which the ink detection chamber 442 is not provided may be acceptable. In this case, the ink supply pipe 443 directly communicates with the inside of the ink pack 143.

The lid member 142 is provided with a substrate 500, a supply pipe hole 421, and a sensor hole 423 in this order from the end portion in the +Z axial direction to the −Z axial direction on an abutting surface 425 on the −Y axial direction side abutting on the printing apparatus 100.

The substrate 500 is attached in an obliquely upward direction to a concave portion 424 formed in the end portion in the +Z axial direction of the lid member 142. A storage device which is not illustrated is mounted on the back surface (surface on the +Y axial direction side) of the substrate 500. On the surface (surface on the −Y axial direction side) of the substrate 500, a plurality of terminals 510 (FIG. 5) electrically connected to the storage device are provided. When the cartridges 140 are attached to the cartridge holder 160, a terminal 912 (FIG. 8) on the side of the printing apparatus 100 provided in the cartridge holder 160 contacts the terminals 510 on the surface of the substrate 500. Then, the control portion 116 of the printing apparatus 100 can access the storage device provided in the cartridge 140.

Into the supply pipe hole 421, the ink supply pipe 443 provided in the liquid flow passage member 144 is exposed. The supply pipe hole 421 is depressed in the +Y axial direction, and has a predetermined depth. The inner wall in a lower portion (−Z axial direction) of the supply pipe hole 421 inclines in such a manner as to rise in the +Z axial direction from the −Y axial direction to the +Y axial direction. In other words, the inner wall in the lower portion (−Z axial direction) of the supply pipe hole 421 inclines in such a manner as to descend in the −Z axial direction from the +Y axial direction to the −Y axial direction.

A stick member 920 (FIG. 8) provided in the printing apparatus 100 is inserted into the sensor hole 423. The end portion in the +Y axial direction of the stick member 920 abuts on a contact portion 496 of a sensor lever 495 provided to the liquid flow passage member 144 through the sensor hole 423 when the cartridges 140 are attached to the cartridge holder 160.

Figure 7:
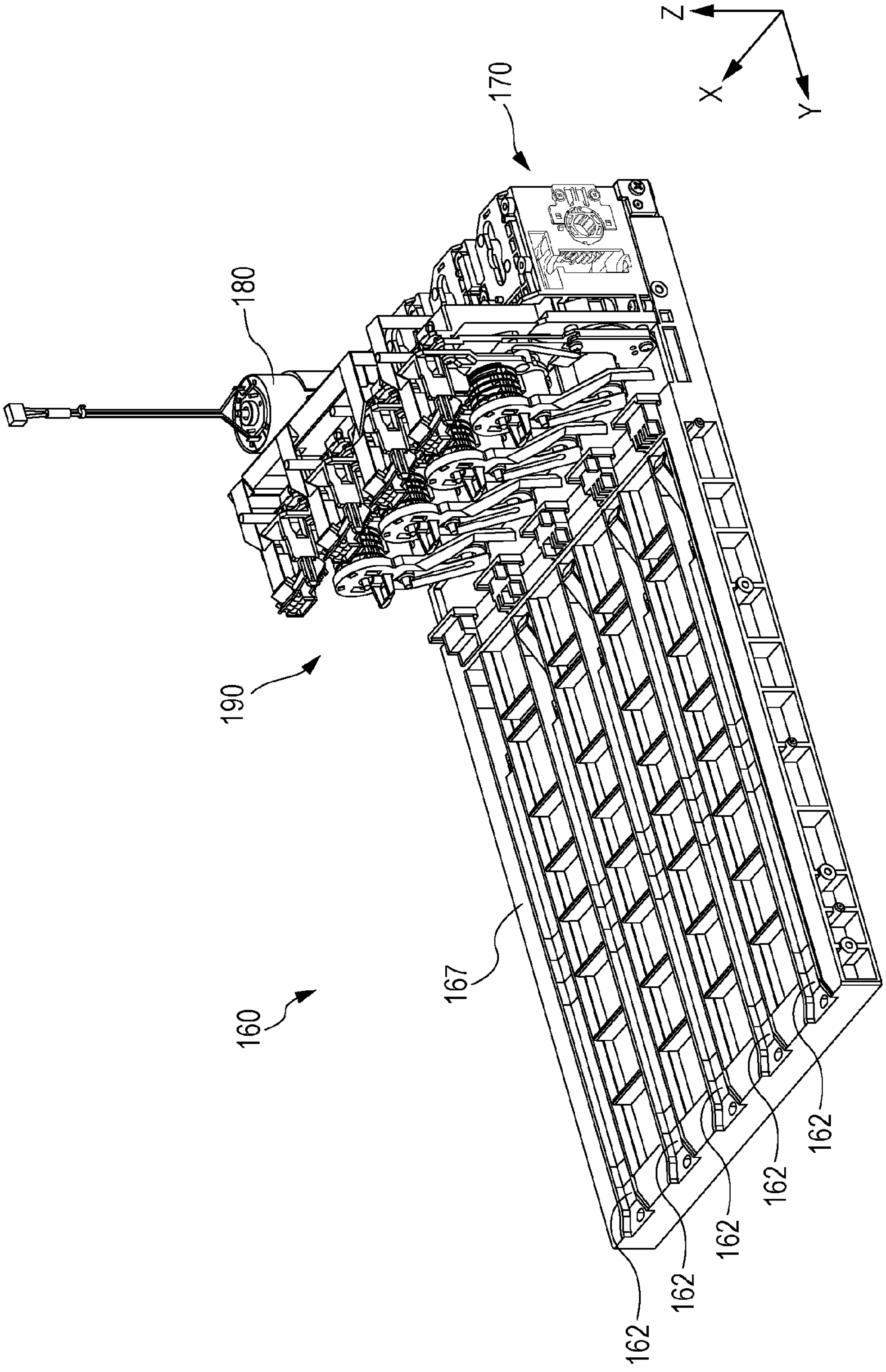
FIG. 7 is a perspective view illustrating the internal structure of the cartridge holder carrying the cartridges containing the liquid container according to one embodiment of the invention.

FIG. 7 is a perspective view illustrating the internal structure of the cartridge holder 160. FIG. 7 illustrates a state where an upper lid 164 and side plates 165 and 166 of the cartridge holder 160 are removed from the cartridge holder 160 illustrated in the perspective view of FIG. 4. As illustrated in FIG. 7, inside the cartridge holder 160, an ink introduction mechanism 190 is erected for each cartridge 140 in contact with the end portion in the −Y axial direction of each of the guide grooves 162 provided on a base plate 167. To each ink introduction mechanism 190, the pump unit 170 is connected.

Figure 8:
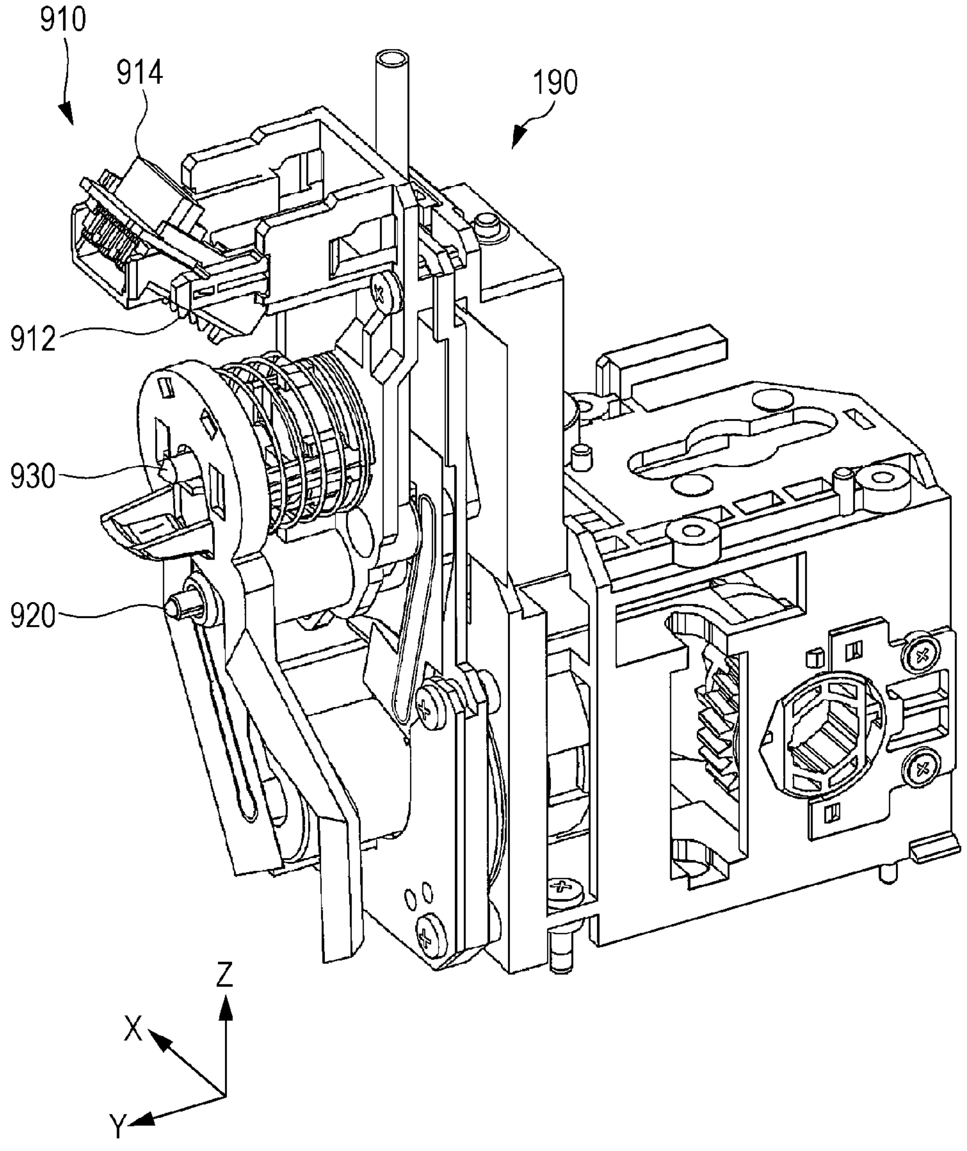
FIG. 8 is a perspective view illustrating an ink introduction mechanism to be connected to the cartridge containing the liquid container according to one embodiment of the invention.

FIG. 8 is a perspective view illustrating the details of the ink introduction mechanism 190. The ink introduction mechanism 190 has a substrate contact portion 910, the stick member 920, and an ink introduction needle 930.

The substrate contact portion 910 is provided at the end portion in the +Z axial direction of the ink introduction mechanism 190. The substrate contact portion 910 has the terminal 912 which electrically contacts the terminals 510 on the substrate 500 provided to the cartridge 140 when the cartridge 140 is attached to the cartridge holder 160. On the back surface of the terminal 912, a connector 914 is provided. The connector 914 is connected to the control portion 116 through a predetermined cable.

The stick member 920 is provided at almost the central portion in the Z axial direction of the ink introduction mechanism 190. When the cartridges 140 are attached to the cartridge holder 160, the end portion on the +Y axial direction side of the stick member 920 is inserted into the sensor hole 423 to contact the contact portion 496 of the sensor lever 495. The end portion on the −Y axial direction side of the stick member 920 is located in the ink introduction mechanism 190, and the position is detected by the photosensor provided in the ink introduction mechanism 190. The control portion 116 detects the remaining state of the ink in the cartridges 140 according to the changes of the position of the end portion in the −Y axial direction of the stick member 920 detected by the photosensor.

The ink introduction needle 930 is provided between the substrate contact portion 910 and the stick member 920 in the Z axial direction. The ink introduction needle 930 is inserted (connected) into the ink supply pipe 443 provided to the cartridges 140 when the cartridges 140 are attached to the cartridge holder 160. In a lower portion of the tip (end portion in the +Y axial direction) of the ink introduction needle 930, an ink introduction port is provided. The ink in the cartridges 140 is introduced into the printing apparatus 100 through the ink introduction port.

The printing apparatus 100 according to this embodiment employs the liquid container 1 described above as the ink pack 143, and therefore the gas generated in the ink pack 143 can be discharged to the outside of the ink pack 143. Thus, the gas can be prevented from flowing into the ejection head 120 of the printing apparatus 100, and therefore the discharge stability of the printing apparatus 100 is excellent. In particular, even in the case where it is estimated that a large amount of hydrogen gas is temporarily generated as in the ink containing the base metal pigment and water described above, the use of the liquid container 1 described above as the ink pack 143 can sufficiently suppress a reduction in stability of the printing apparatus 100.

The invention is not limited to the above-described embodiment, and can be modified in various manners. For example, the invention includes the substantially same structure (e.g., structure with the same functions, methods, and results or structure with the same objects and effects) as the structures described in the embodiment. The invention also includes a structure in which non-essential portions of the structure described in the embodiments are replaced. The invention also includes a structure that can demonstrate the same effects or a structure that can achieve the same objects as those in the structures described in the embodiment. The invention also includes a structure in which known techniques are added to the structures described in the embodiment.

What is claimed is:

1. A liquid container, comprising:

a containing chamber in which liquid which temporarily generates gas by a chemical change of contained components is contained;

a circulation port which communicates with the containing chamber and circulates the liquid;

a valve provided in such a manner as to connect the containing chamber to an outside thereof; and a decompression chamber which is decompressed to be lower than an atmospheric pressure and at least one part of which is disposed inside the containing chamber, wherein at least one part which is disposed inside the containing chamber of a member partitioning the decompression chamber has a hydrogen penetration amount of 0.0001 ml/cm$^2$·day·atm or more and 0.01 ml/cm$^2$·day·atm or lower per day.

2. The liquid container according to claim 1, wherein at least one kind of the contained components is a base metal pigment.

3. The liquid container according to claim 2, wherein the base metal pigment is coated with a protective film.

4. The liquid container according to claim 1, comprising:

a hydrogen absorption substance disposed in at least one of the containing chamber and the decompression chamber.

5. The liquid container according to claim 1, comprising:

a buffer chamber which is connected to the valve and is disposed at the outside of the containing chamber, wherein the buffer chamber has a hole which opens to the outside.

6. The liquid container according to claim 1, which is connected to a liquid consumption apparatus to be used, wherein when the liquid container and the liquid consumption apparatus are connected to each other, the valve is disposed at a position where the gas gathers.

7. The liquid container according to claim 1, wherein the valve is connected to at least one of the containing chamber and the decompression chamber.

8. The liquid container according to claim 1, which is connected to a liquid consumption apparatus to be used, wherein the containing chamber has a first region and a second region where a pressure resistance is lower than a pressure resistance of the first region, and when the liquid container and the liquid consumption apparatus are connected to each other, the second region is disposed at a position where the gas gathers.

* * * * *